(12) United States Patent  (10) Patent No.: US 7,668,836 B2
Fung et al.  (45) Date of Patent: Feb. 23, 2010

(54) IMS SOAP GATEWAY DEPLOYMENT UTILITY

(75) Inventors: Haley Hoi Lee Fung, Alviso, CA (US); Shyh-Mei Ho, Cupertino, CA (US); Srividhya Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 11/219,441

(22) Filed: Sep. 2, 2005

(65) Prior Publication Data

US 2007/0055678 A1  Mar. 8, 2007

(51) Int. Cl.
 *G06F 17/30* (2006.01)
 *G06F 7/00* (2006.01)
(52) U.S. Cl. .............................. 707/10; 707/100; 707/3
(58) Field of Classification Search .................. 707/10
 See application file for complete search history.

(56) References Cited

U.S. PATENT DOCUMENTS

| | | | |
|---|---|---|---|
| 6,775,680 B2 | 8/2004 | Ehrman et al. ............. 707/102 |
| 6,801,604 B2 | 10/2004 | Maes et al. ............. 379/88.17 |
| 7,181,493 B2 | 2/2007 | English et al. |
| 7,194,733 B2 * | 3/2007 | Ringseth et al. ............. 717/136 |
| 2002/0107992 A1 * | 8/2002 | Osbourne et al. ........... 709/310 |
| 2003/0110167 A1 | 6/2003 | Kim ............................... 707/4 |
| 2004/0237034 A1 | 11/2004 | Chiang et al. ............... 715/513 |
| 2005/0659410 | * 3/2005 | Trossen et al. ........... 455/456.1 |
| 2005/0117179 A1 * | 6/2005 | Ito et al. ..................... 358/1.15 |
| 2005/0165936 A1 | 7/2005 | Haller et al. ................ 709/228 |
| 2006/0106585 A1 * | 5/2006 | Brown et al. .................... 703/1 |
| 2006/0117073 A1 * | 6/2006 | Bosworth et al. ........... 707/201 |
| 2006/0271563 A1 | 11/2006 | Angelo et al. |

FOREIGN PATENT DOCUMENTS

KR  1020040041718 A  5/2004

OTHER PUBLICATIONS

Timmy Eap, Marek Hatala, Griff Richards, "Digital Repository Interoperability: Design, Implementation and Deployment of the ECL Protocol and Connecting Middleware", WWW 2004, May 17-22, 2004, New York, New York, USA, pp. 376-377.

(Continued)

*Primary Examiner*—Baoquoc N To
(74) *Attorney, Agent, or Firm*—Janet M. Skafar; Terrence J. Carroll

(57) ABSTRACT

Various embodiments of a method, system and computer program product enable an application to be accessed as a web service. In response to a command, a web service is deployed to a gateway server, and a connection bundle and a correlator file are provided such that they are accessible to the gateway server. The web service was generated based on a web service description language file that is based on an input-output message description of the application, and is accessible to a client using a SOAP message. The gateway server sends a request message to the application based on the SOAP message in accordance with the web service, and receives a reply message from the application. The connection bundle comprises connection information to interface with the application. The correlator file comprises a name of an interface module associated with the application and the name of the connection bundle.

28 Claims, 12 Drawing Sheets

OTHER PUBLICATIONS

Lori MacVittie and Jeff Forristal, "Enemy at the Gateway", www.nwc.com, Oct. 16, 2003, Network Computing, vol. 14, No. 21, Oct. 16, 2003, pp. 45, 46, 48, 50, 53, 54, 56, 58, 63.

Henry N. Jerez, Xiaoming Liu, Patrick Hochstenbach, Herbert Van de Sompel, "The Multi-faceted Use of the OAI-PMH in the LANL Repository," JCDL '04, Jun. 7-11, 2004, Tucson, Arizona, USA, pp. 11-20.

Marek Hatala, Griff Richards, Timmy Eap and Jordan Willms, "The Interoperability of Learning Object Repositories and Services: Standards, Implementations and Lessons Learned," WWW 2004, May 17-22, 2004, New York, New York, USA, pp. 19-27.

IBM WebSphere Developer for zSeries Version 6.0, Developing XML interfaces for COBOL applications, First Edition, Feb. 2005, GI10-3360-00, pp. i-vi, 1-130.

IMS SOAP Gateway, [online] [retrieved on Jun. 16, 2005] Retrieved from the Internet: <URL: http://www-306.ibm.com/software/data/ims/soap/>. 1 page.

IMS SOAP Gateway Technology Preview Sample Download, [online] [retrieved on Jun. 16, 2005] Retrieved from the Internet: <URL: http://www-306.ibm.com/software/data/ims/soap/download.html>. 1 page.

IBM WebSphere Studio Enterprise Developer V5.1.2—Simplifying the development of Java, COBOL, and PL/I mixed workload applications, [online] Oct. 12, 2004 [retrieved on Jul. 24, 2005] Retrieved from the Internet: <URL: http://www-306.ibm.com/fcgi-bin/common/ssi/ssialias?infotype=an&subtype=ca&appname=Dem...> 17 pages.

WebSphere Developer for zSeries [online] [retrieved on Jun. 17, 2005] Retrieved from the Internet: <URL: http://www-306.ibm.com/software/awdtools/devzseries/>. 2 pages.

SOAP—Wikipedia [online] page last modified May 1, 2005 [retrieved on May 4, 2005] Retrieved from the Internet: <URL: http://en.wikipedia.org/wiki/SOAP>. 3 pages.

Venu Vasudevan, XML.com: A Web Services Primer,[online] Copyright 1998-2005 [retrieved on Aug. 15, 2005] Retrieved from the Internet: <URL: http://webservices.xml.com/lpt/a/ws/2001/04/04/webservices/index.html>. 9 pages.

Venu Vasudevan, XML.com: A Web Services Primer [online] Copyright 2005 [retrieved on Aug. 15, 2005] Retrieved from the Internet: <URL: http://webservices.xml.com/pub/a/ws/2001/04/04/webservices/index.html?page=2>. 4 pages.

Venu Vasudevan, XML.com: A Web Services Primer [online] Copyright 2005 [retrieved on Aug. 15, 2005] Retrieved from the Internet: <URL: http://webservices.xml.com/pub/a/ws/2001/04/04/webservices/index.html?page=3>. 4 pages.

Uche Ogbuji, Using WSDL in SOAP applications [online] Nov. 1, 2000 [retrieved on Aug. 15. 2005 ] Retrieved from the Internet: <URL: http://www-128.ibm.com/developerworks/library/ws-soap/?dwzone=ws>. 6 pages.

Java Boutique—Using SOAP with Java—p. 2 [online] Copyright 2005 [retrieved on Aug. 12, 2005] Retrieved from the Internet: <URL: http://javaboutique.internet.com/tutorials/SOAP/test.html>. 3 pages.

Ethan Cerami, Web Services Essentials: Chapter 6: WSDL Essentials [online] Feb. 2002 [retrieved on Aug. 12, 2005] Retrieved from the Internet: <URL: http://www.oreilly.com/catalog/webservess/chapter/ch06.html>. 30 pages.

Tutorial for building J2EE Applications using JBOSS and ECLIPSE, [online] Copyright 2003 [retrieved on Aug. 16, 2005] Retrieved from the Internet: <URL: http://www.tusc.com.au/tutorial/html/chap9.html>. 29 pages.

Axis User's Guide, [online] [retrieved on Aug. 16, 2005] Retrieved from the Internet: <URL: http://docs.pushtotest.com/axisdocs/user-guide.html>. 33 pages.

What is a WSDD file? [online] [retrieved on Aug. 16, 2005] Retrieved from the Internet: <URL: http://download.omii.ac.uk/omii/downloads/documentation/omii_1_2_0/reference/apache_axis/ws.. >. 3 pages.

Mapping between Java language, WSDL and XML: WebSphere Application Server Express [online] Last updated Jun. 2, 2005 [retrieved on Aug. 12, 2005] Retrieved from the Internet: <URL: http://publib.boulder.ibm.com/infocenter/wasinfo/v5r1//topic/com.ibm.websphere.exp.doc/info/exp/ae/rwbs_map.html >. 21 pages.

Developing EJB implementation templates and bindings from a WSDL file, [online] Last updated Jun. 2, 2005 [retrieved on Aug. 12, 2005] Retrieved from the Internet: <URL: http://publib.boulder.ibm.com/infocenter/wasinfo/v5r1//topic/com.ibm.websphere.exp.doc/info/exp/ae/twbs_devejbbindings.html >. 1 page.

Example: Developing a Web service from an EJB or JavaBean, [online] Last updated Jun. 2, 2005 [retrieved on Aug. 12, 2005] Retrieved from the Internet: <URL: http://publib.boulder.ibm.com/infocenter/wasinfo/v5r1//topic/com.ibm.websphere.exp.doc/info/exp/ae/rwbs_devxmp.html >. 2 pages.

wsdeploy command: WebSphere Application Server Express [online] Last updated Jun. 2, 2005 [retrieved on Aug. 12, 2005] Retrieved from the Internet: <URL: http://publib.boulder.ibm.com/infocenter/wasinfo/v5r1//topic/com.ibm.websphere.exp.doc/info/exp/ae/rwbs_wsdeploy.html >. 3 pages.

Artifacts used to develop Web services based on Web Services for J2EE [online] Last updated Jun. 2, 2005 [retrieved on Aug. 12, 2005] Retrieved from the Internet: <URL: http://publib.boulder.ibm.com/infocenter/wasinfo/v5r1//topic/com.ibm.websphere.exp.doc/info/exp/ae/rwbs_devartifacts.html >. 2 pages.

Macromedia—JRun LiveDocs: Generating Java code from a WSDL document [online] [retrieved on Sep. 1, 2005] Retrieved from the Internet: <URL: http://livedocs.macromedia.com/jrun/4/Programmers_Guide/ws_wsd15.htm>. 4 pages.

Axis-wsdl2java Task [online] [retrieved on Aug. 16, 2005] Retrieved from the Internet: <URL: http://ws.apache.org/axis/java/ant/axis-wsdl2java.html>. 3 pages.

Oracle9i Application Server Web Services Developer's Guide, Release 2 (9.0.2), Part No. A95453-01, Web Services Overview, [online] Copyright 2002 [retrieved on Jun. 22, 2005] Retrieved from the Internet: <URL: http://www.di.unipi.it/~ghelli/bdl/A97329_03/web.902/a95453/intro.htm> 7 pages.

Oracle9i Application Server Web Services Developer's Guide, Release 2 (9.0.2), Part No. A95453-01, Building Clients that Use Web Services [online] Copyright 2002 [retrieved on Jun. 22, 2005] Retrieved from the Internet: <URL: http://www.di.unipi.it/~ghelli/bdl/A97329_03/web.902/a95453/useservices.htm> 8 pages.

Oracle9i Application Server Web Services Developer's Guide, Release 2 (9.0.2), Part No. A95453-01, Using Oracle SOAP [online] Copyright 2002 [retrieved on Jun. 22, 2005] Retrieved from the Internet: <URL: http://www.di.unipi.it/~ghelli/bdl/A97329_03/web.902/a95453/oraclesoap.htm> 37 pages.

* cited by examiner

```
*******************************************************
*                                                     *
* Welcome to the IMS SOAP Gateway Deployment Tool     *
*                                                     *
*******************************************************
```
This utility helps you to publish your IMS applications as a Web Service
using the IMS SOAP Gateway. Please choose from the following tasks Task 1: Start the IMS SOAP gateway. ⟵ 102

------------------------------------------------------------------ ⟵ 104

Task 2: Stop the IMS SOAP gateway.

------------------------------------------------------------------ ⟵ 106

Task 3 : Setup or Update IMS SOAP Gateway properties

- Tracing :
           -Choose Trace level [1-5]: 1-Fatal, 2-Error, 3-Warn, 4-Info,
            5-Debug (Default: 2)
           -Provide Trace filename or directory
              (Default: imssoap/logs/trace.log)
       - Logging :
           -Provide maximum output file size (Default: 100KB)
           -Provide maximum number of backup files (Default: 2)
       - Set Port Number for the SOAP Server
           -Provide port number (Default : 8080) :

------------------------------------------------------------------ ⟵ 108

Task 4: Setup properties and Deploy your IMS application to the IMS SOAP gateway,
as a web service.

This task will guide you through 4 steps.
       - Provide the full path and name of the WSDL file
         (eg:c:\myfiles\myApp.wsdl)
        If no path is provided(eg: myApp.wsdl), it is assumed that the file
        is in the IMSSOAP_HOME\wsdl folder. ⟵ 122

Step a: Provide Connection properties for connecting to IMS
       - Do you want to use an existing connection bundle? [Y/N]
       - IF Yes, provide :
       - Do you want to view the available connection bundles ? [Y/N]
         -Name of existing connection bundle
       - IF No, provide :
         -Name for new connection bundle
         -IMS Connect hostname or IP address
         -IMS Connect portnumber (default: 9999)
         -IMS datastore name
         -RACF userID (Optional)
         -RACF group name (Optional)
         -RACF password (Optional)

FIG. 5A

| FIG. 5A |
| FIG. 5B |
| FIG. 5C |
| FIG. 5D |

FIG. 5

```
                    ┌─124                                                    ┌─94
Step b: Provide Interaction (Correlator) properties for application If you use the IBM-provided WebSphere Developer for Zseries solution for generating
the converters, the correlator file is generated for you as part of that process.
If you have a Roll-Your-Own solution and generate your own converters, you can use
this step to create the correlator file.
Ensure that the converters get compiled and configured in IMSConnect.

- Do you want to use an existing Correlator file? [Y/N]
            - IF Yes, provide :
            - Provide the full path and name of the Correlator file
                  (eg:c:\myfiles\myCorr.xml):
              If no path is provided(eg: myCorr.xml), it is assumed that the file
              is in the IMSSOAP_HOME\xml folder.
              If a path was specified for the WSDL file, this field has a default
              value of
              WSDL_File_Path\myApp.xml, where myApp is the name of the wsdl file.
              If no path was provided for WSDL file, this field has a default of
              IMSSOAP_HOME\xml\myApp.xml where myApp is the name of the wsdl file.
            - IF No, provide :
            - Driver name on host
            - Socket timeout value (default: 0)
            - Execution timeout value (default: 0)
            - LtermName (optional)
            - Inbound code page value (Default : 1208)
            - Host code page value (Default : 1140)
       ┌─126 - Outbound code page value (Default : 1208)

Step c: Deploy application to IMS SOAP gateway ? [Y/N]
            - Is the SOAP gateway already started ? [Y/N]:
       ┌─128   If No, Soap gateway will be started.

Step d: Generate java client code (optional)
            - Path to the target directory for client code
                  (Default: IMSSOAP_HOME\temp\Client)

------- ┌─110 --------------------------------------------------------------
Task 5 :Create (if using RYO adapter) or Update interaction (correlater) properties
            - For "Create" provide :
            - Provide the full path and name of the WSDL file
                  (eg:c:\myfiles\myApp.wsdl)
              If no path is provided(eg: myApp.wsdl), it is assumed that the file
              is in the IMSSOAP_HOME\wsdl folder.
                  -Driver name on host
                  -Socket timeout value (default: 0)
                  -Execution timeout value (default: 0)
                  -LtermName (optional)
                  -Connection Bundle Name
                  -Inbound code page value (Default : 1280)
                  -Host code page value (Default : 1140)
                  -Outbound code page value (Default : 1280)

- Provide the full path and name of the Correlator file
                  (eg:c:\myfiles\myCorr.xml):
              If no path is provided(eg: myCorr.xml), it is assumed that the file
              is in the IMSSOAP_HOME\xml folder.
              If a path was specified for the WSDL file, this field has a default
```

FIG. 5B

```
---------------------112----------------------------------------------------96
Task 6 : Create, Delete or Update IMS Connection Bundle (C/D/U)

- Name of Connection Bundle
        - Do you want to view the connection bundle ? [Y/N]
        - For "Create" provide :
                -IMS hostname or IP address
                -IMS portnumber (default: 9999)
                -IMS datastore name
                -RACF userID (Optional)
                -RACF group name (Optional)
                -RACF password (Optional)
        - For "Update" choose the property you want to update:
                - hostname(h), portnumber(p), datastore(d), userID(u),
                  group(g), password(s)
                - Curent value is : (existing value), Enter new value :
        114
---------------------------------------------------------------------------
Task 7: Deploy application to IMS SOAP gateway
        - Is the SOAP gateway already started ? [Y/N]
        If No, Soap gateway will be started.
        - Provide the full path and name of the WSDL file
                (eg:c:\myfiles\myApp.wsdl)
        If no path is provided(eg: myApp.wsdl), it is assumed that the file
        is in the IMSSOAP_HOME\wsdl folder.
        - Provide the full path and name of the Correlator file
                (eg:c:\myfiles\myCorr.xml):
        If no path is provided(eg: myCorr.xml), it is assumed that the file
        is in the IMSSOAP_HOME\xml folder.
        If a path was specified for the WSDL file, this field has a default
        value of WSDL_File_Path\myApp.xml, where myApp is the name of the
        wsdl file.
        If no path was provided for WSDL file, this field has a default of
        IMSSOAP_HOME\xml\myApp.xml where myApp is the name of the wsdl file 116
---------------------------------------------------------------------------
Task 8 : Generate java client code for your application
        - Provide the full path and name of the WSDL file
                (eg:c:\myfiles\myApp.wsdl)
        If no path is provided(eg: myApp.wsdl), it is assumed that the file
        is in the IMSSOAP_HOME\wsdl folder.
        - Path to the target directory for client code
                (Default: IMSSOAP_HOME\temp\Client)
        118
---------------------------------------------------------------------------
Task 9 : Undeploy an application from the IMS SOAP Gateway
        - Provide the name of the Service to be undeployed
                (eg:PhoneBookService)
        It is assumed that the service has a wsdl file of the same name
        (eg:PhoneBookService.wsdl) already deployed in the soap gateway.

```
                                            ,-120
Task 10 : Exit tool

~~~~~~~~~~~~~~~~~~~~~~~~~~~~~~~~~~~~~~~~~~~~~~~~~~~~~~~~~~
Please choose from the following options :
Type the task number followed by "help" for help on a particular task
   1: Start IMS SOAP Gateway
   2: Stop the IMS SOAP Gateway
   3: Setup or Update IMS SOAP Gateway properties
   4: Setup Properties & Deploy application to SOAP Gateway
   5: Set IMS Correlator properties
   6: Set Connection properties
   7: Deploy Application
   8: Generate java client code
   9: Undeploy application
   10: Exit
~~~~~~~~~~~~~~~~~~~~~~~~~~~~~~~~~~~~~~~~~~~~~~~~~~~~~~~~~~
 Please enter your selection here:
```

IMS SOAP GATEWAY DEPLOYMENT UTILITY

BACKGROUND OF THE INVENTION

1.0 Field of the Invention

This invention relates to a deployment utility; and in particular, to a utility to enable an Information Management System (IMS™ (Trademark of International Business Machines Corporation)) application to be accessed as a web service using SOAP.

2.0 Description of the Related Art

There is enormous demand from legacy system customers to enable their applications with the eXtensible Markup Language (XML). One example of a legacy system is the IBM® (Registered trademark of International Business Machines Corporation) IMS system. The Simple Object Access Protocol (SOAP) is an industry standard protocol for exchanging information in a distributed environment. SOAP is an XML-based protocol that defines the use of XML and HyperText Transport Protocol (HTTP) to access services, objects and servers independent of the platform. However, the process involved in order to enable a legacy system application to be accessed as a web service using SOAP can be complex and error-prone. Therefore, there is a need for a utility which simplifies the process of enabling legacy system applications for access as Web services which use SOAP.

SUMMARY OF THE INVENTION

To overcome the limitations in the prior art described above, and to overcome other limitations that will become apparent upon reading and understanding the present specification, various embodiments of a method, system and computer program product enable an application in a legacy system to be accessed as a web service. In response to a command from a user, a web service is deployed to a gateway server, and a connection bundle and a correlator file are provided such that they are accessible to the gateway server. The web service was generated based on a web service description language file that is based on an input-output message description of the application. The web service is accessible to a client using a SOAP message. The gateway server is to send a request message to the application based on the SOAP message in accordance with the web service. The gateway server is to receive a reply message from the application and return a SOAP response to the client based on the reply message in accordance with the web service. The connection bundle comprises connection information to interface with the application. The correlator file comprises a name of an interface module associated with the application and the name of the connection bundle.

In this way, a deployment utility is provided which enables an IMS application to be accessed as a web service at an IMS SOAP gateway.

BRIEF DESCRIPTION OF THE DRAWINGS

The teachings of the present invention can be readily understood by considering the following description in conjunction with the accompanying drawings, in which:

FIG. 5 comprises FIGS. 5A, 5B, 5C and 5D which collectively depict a diagram of an embodiment of a user interface of a deployment utility which can be used to deploy a web service to the IMS SOAP gateway of FIG. 1;

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to enable an IMS application to be accessed as a web service at an IMS-SOAP gateway. Various embodiments of a computer-implemented method, system and article of manufacture enable an application in a legacy system to be accessed as a web service. In response to a command from a user, a web service is deployed to a gateway server, and a connection bundle and a correlator file are provided such that they are accessible to the gateway server. The web service was generated based on a web service description language file that is based on an input-output message description of the application. The web service is accessible to a client using a SOAP message. The gateway server is to send a request message to the application based on the SOAP message in accordance with the web service. The gateway server is to receive a reply message from the application and return a SOAP response to the client based on the reply message in accordance with the web service. The connection bundle comprises connection information to interface with the application. The correlator file comprises a name of an interface module associated with the application and the name of the connection bundle.

Figure 1:
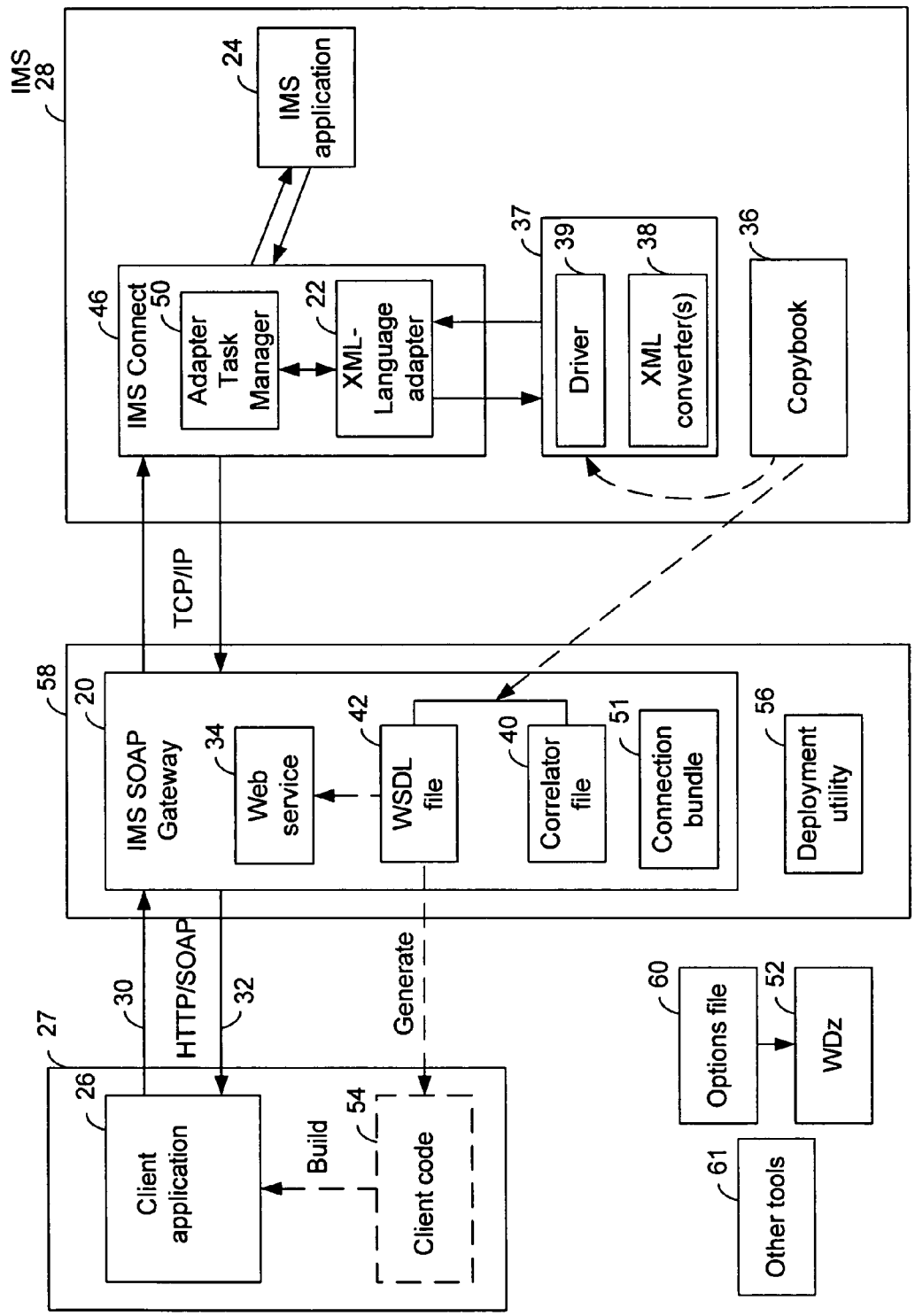
FIG. 1 depicts a diagram illustrating an embodiment of an IMS SOAP gateway.

FIG. 1 depicts a diagram illustrating an embodiment of an IMS SOAP gateway 20. The IMS SOAP gateway 20 provides the ability for IMS customers to re-use existing IMS business logic and to create new IMS business logic by allowing users to enable an IMS application 24 to be accessed as a web service. In particular, the IMS SOAP gateway 20 enables an IMS application 24 to interoperate with other applications, such as a client application 26, outside of the IMS environment 28 through SOAP. The IMS SOAP gateway 20 is typically implemented as a server. The client application 26, on a client computer system 27, sends requests 30 and receives replies 32 from the IMS SOAP gateway 20 using HTTP/SOAP.

Various artifacts are generated and deployed to the IMS SOAP gateway 20 so that the IMS application 24 can be accessed as a web service. In some embodiments, the artifacts comprise a web service 34, a correlator file 40 and a connection bundle 51.

The IMS application 24 typically uses a programming language, for example, the COmmon Business Oriented Language (COBOL) or Programming Language One (PL/1), to implement the business logic. In some embodiments, as part of enabling IMS applications for Web services, IBM WebSphere® (Registered trademark of International Business Machines Corporation) Developer for zSeries (WDz) 52 utility is used to generate Web service artifacts without changing the IMS application code. In various embodiments, WDz 52 takes a copybook 36, for example, a COBOL copybook, which describes the input and output message format for IMS transactional applications and generates the following web service artifacts: a converter-driver file 37, the correlator file 40 and a Web Services Description Language (WSDL) file 42.

The converter-driver file 37 comprises one or more XML converters 38 and a driver 39. In response to receiving an XML request message from the IMS SOAP gateway 20 which specifies the driver 39, an XML-language Adapter 22 calls that driver 39 which invokes one of the converters 38. In some embodiments, the XML converters 38 comprise an input XML converter and an output XML converter. The converters 38 are used to transform the XML message from the IMS SOAP gateway 20 into a specific language, for example, COBOL bytes, for the IMS application 24 and then back to XML and sent to the IMS SOAP gateway. In various embodiments, the XML-language adapter 22 is an XML adapter for the COmmon Business Oriented Language (COBOL). Alternately, the XML-language adapter 22 is an XML adapter for Programming Language One (PL/1). However, the XML-language adapter 22 is not meant to be limited to COBOL or PL/1 and other languages may be used. In some embodiments, XML converters 38 are not generated and not used.

The correlator file 40 contains one or more correlator properties which enables the IMS SOAP gateway 20 to set one or more IMS properties and call the IMS application 24. In various embodiments, the correlator file 40 specifies an interface module, that is, the driver 39, and in some embodiments, the converter(s) 38, to be used with the web service 34, in addition to other correlator properties. In some embodiments, the correlator file 40 is in the XML format.

The WSDL file 42 provides a description of the IMS application 24 so that the client application 26 can communicate with the IMS application 24 as web service 34. WSDL is an XML-based language which can be used to describe a web service's capabilities as collections of communication endpoints capable of exchanging messages.

In some embodiments, the IMS SOAP gateway 20 sends requests to and receives replies from IMS 28 using TCP/IP. The IMS SOAP gateway 20 provides an interface between the client application 26 and IMS Connect 46. IMS Connect 46 receives the requests from and replies to the IMS SOAP gateway 20 and interfaces with the IMS application 24. Typically, the IMS application 24 is executing within a z/OS environment. In various embodiments, the client application 26 can be a Java, .Net, SAP® (Registered Trademark of SAP AKTIENGELLSCHAFT Corporation, Federal Republic of Germany) or other third-party client. The client application 26 sends a SOAP message to the IMS SOAP gateway 20 over HTTP. The IMS SOAP gateway 20 processes the SOAP message envelope and header sections, and passes the SOAP message's body section's payload data to IMS Connect 46 in XML format using TCP/IP. To process the SOAP message, the IMS SOAP gateway 20 accesses the web service 34, correlator file 40 and connection bundle 51. In some embodiments, the connection bundle 51 is a connection bundle file. In other embodiments, a connection bundle file comprises multiple connection bundles. In some embodiments, the connection bundle is stored in XML format. Within IMS Connect 46, the adapter task manager 50 calls the XML-Language adapter 22, and the XML-Language adapter 22 maps the request from the IMS SOAP gateway to the appropriate XML driver 39 which calls an appropriate XML converter 38 to convert the XML payload data to a specific language, for example, COBOL bytes, which are sent to the IMS application 24. For the response, the IMS application 24 sends the response to IMS Connect 46. The adapter task manager 50 invokes the appropriate XML-language adapter 22 which calls the appropriate driver 39 which calls the appropriate converter 38 to convert the response to XML format. IMS connect 46 sends the XML response to the IMS SOAP gateway 20 which converts the XML response to SOAP message(s) and sends the SOAP message(s) to the client application 26.

Typically, a Java or web service developer, a web server administrator, a system programmer and a Java or Net developer are involved in order to allow a client application to interact with the IMS application 24. The Java or web service developer typically generates the WSDL file 42, correlator file 40 and XML converters 38 based on the copybook 36 using WDz 52. In some embodiments, the web service developer publishes the WSDL file 42 to a Universal Description Discovery and Integration (UDDI) registry or a local repository. UDDI is an XML-based protocol that provides a registry service for Web services that manages information about service providers, implementations and metadata. The web server administrator deploys the WSDL file 42 and the correlator file 40 to the IMS SOAP gateway 20 and creates a connection bundle 51. The system programmer typically configures IMS Connect 46 and compiles the XML converters 38. The Java or .Net developer typically generates the client code, for example, the Client-Side proxy 54, from the WSDL file 42 and writes the client application to invoke the web service 34.

Using WDz 52, the web service developer steps through multiple wizards in order to create the WSDL file 42, correlator file 40, and converter-driver file 37. Stepping through each wizard is very tedious and time-consuming, and especially when processing hundreds and thousands of IMS COBOL copybooks. In various embodiments, the deployment utility 56 simplifies the deployment of one or more of the artifacts, such as the web service 34 generated from the WSDL file 42, correlator file 40 and connection bundle 51, to the IMS SOAP gateway 20, and the XML converters 38 and driver 39 to IMS 28.

In various embodiments, the deployment utility 56 is a stand-alone utility that generates the WSDL file 42, the converter-driver 37, client code 54, web service 34 and correlator file 40 based on the IMS application copybook 36 and appropriately deploys the generated files and code to the IMS SOAP gateway server 58, IMS 28 and client system 27. In some embodiments, the deployment utility 56 invokes other utilities or tools 61, such as WDz and Apache Axis, to perform various aspects of deploying a web service to the IMS SOAP gateway 20. In various embodiments which use WDz, an options file 60 is also created and will be explained in further detail below with reference to FIG. 9.

Figure 2:
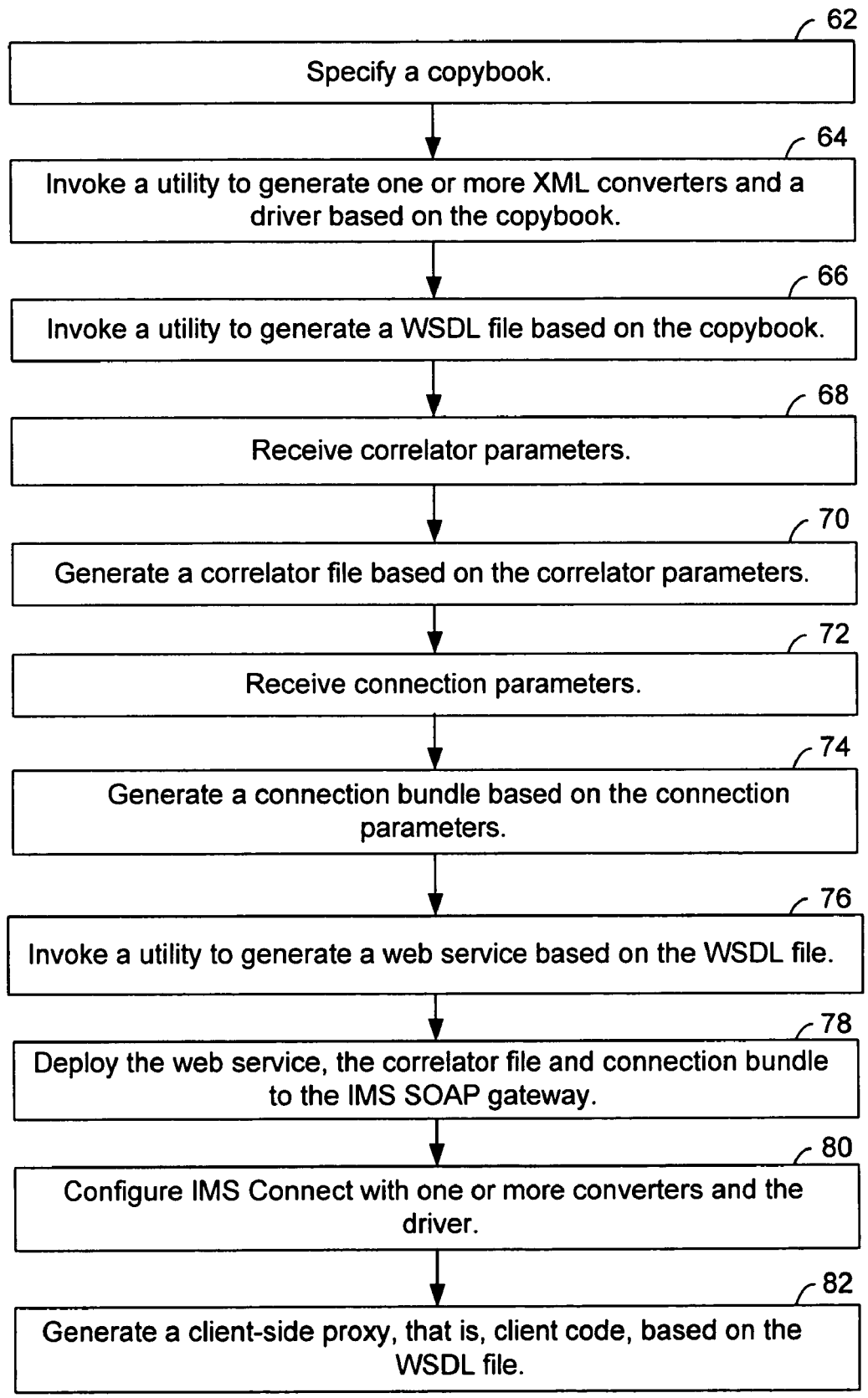
FIG. 2 depicts a flowchart of an embodiment of a deployment utility to deploy a web service to the IMS SOAP gateway of FIG. 1.

FIG. 2 depicts a flowchart of an embodiment of the deployment utility. In step 62, a user specifies a copybook. The copybook provides an input-output message description of the IMS application. In step 64, the deployment utility invokes another utility to generate one or more XML converters and a driver based on the copybook. In some embodiments, the deployment utility invokes WDz. In step 66, the deployment utility invokes another utility to generate a WSDL file based on the copybook. In some embodiments, the utility is WDz. Although various embodiments will be described with respect to a copybook, the invention is not meant to be limited to a copybook and other input-output message descriptions may be used. In addition, although various embodiments will be described with respect to an IMS application, the deployment utility may be used with other applications. In some embodiments, the deployment utility is used with legacy system applications. In various embodiments, a legacy system is an Enterprise Information System (EIS) which typically runs a mission critical application on a host, rather than a workstation or personal computer, environment; and the deployment utility enables the legacy system application to be accessed as a web service.

In step 68, correlator parameters are received. In step 70, a correlator file is generated based on the correlator parameters. In various embodiments, the correlator file provides a reference to the driver. In some embodiments, the correlator file provides a reference to at least one XML converter. In some embodiments, a utility, such as WDz, is invoked to generate the correlator file. In step 72, the deployment utility receives connection bundle parameters. In step 74, the deployment utility generates a connection bundle based on the connection bundle parameters.

In step 76, the deployment utility invokes yet another utility to generate a web service based on the WSDL file. To generate the web service, the deployment utility invokes a conversion utility, for example, a conversion utility of Apache Axis, to convert the WSDL file to Java code, that is, one or more Java classes. The Java classes provide one or more methods which can be invoked by a client application to access the IMS application. In other words, the web service is implemented using Java classes. In other embodiments, the web service may be implemented using other programming languages, for example, C and C++. In some embodiments, the WSDL file, the web service comprising one or more classes and method(s), the correlator file and the connection bundle are associated with each other based on predefined naming conventions used by the deployment utility and IMS SOAP gateway.

In step 78, the deployment utility deploys the web service, the correlator file and connection bundle to the IMS SOAP gateway. The IMS SOAP gateway is configured to provide the web service. The correlator file is stored in a sub-directory of the IMS SOAP gateway. The connection bundle is stored in a connection bundle file of the IMS SOAP gateway. In this way, the correlator file and connection bundle are deployed or provided, that is, made accessible to, the IMS SOAP gateway.

In step 80, the deployment utility configures IMS connect with one or more of the XML converters and the driver. In various embodiments, the deployment utility installs the XML converter(s) and driver such that the XML converter(s) and driver are known and accessible to the XML-language adapter of IMS Connect. In other embodiments, step 80 is omitted.

In step 82, the deployment utility invokes a utility to generate the client-side proxy, that is, client code, based on the WSDL file. In some embodiments, an Apache Axis utility is invoked to generate the client code; however, in other embodiments, other utilities may be used. The client code is stored in a predetermined location and made available for a user, for example, a Java developer, to use with the client application. For example, the client application can invoke a method in the client code to invoke the web service. In other embodiments, step 82 is omitted.

In some embodiments, a user invokes WDz to generate the XML converter-driver file, the correlator file and the WSDL file (steps 64, 66 and 70), prior to invoking the deployment utility. In other embodiments, the deployment utility invokes WDz to generate the XML converters, the correlator file and the WSDL file (steps 64, 66 and 70). In other embodiments, utilities other than WDz are used to generate the WSDL file.

In another embodiment, converters are not used; therefore the converters are omitted from steps 64 and 80.

Figure 3:
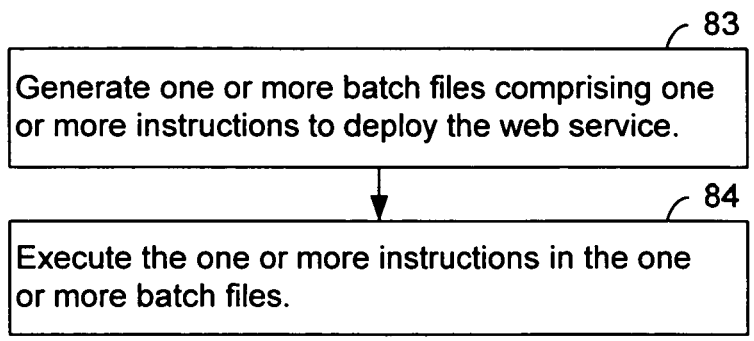
FIG. 3 depicts a flowchart of an embodiment of generating a web service and at least a portion of the step which deploys a web service of FIG. 2.

FIG. 3 depicts a flowchart of an embodiment of generating a web service based on a WSDL file of step 76 of FIG. 2 and at least a portion of step 78 of FIG. 2 which deploys a web service. In step 83, the deployment utility generates one or more batch files comprising one or more instructions to generate and deploy the web service. In step 84, the deployment utility executes the one or more instructions in the one or more batch files.

Figure 4:
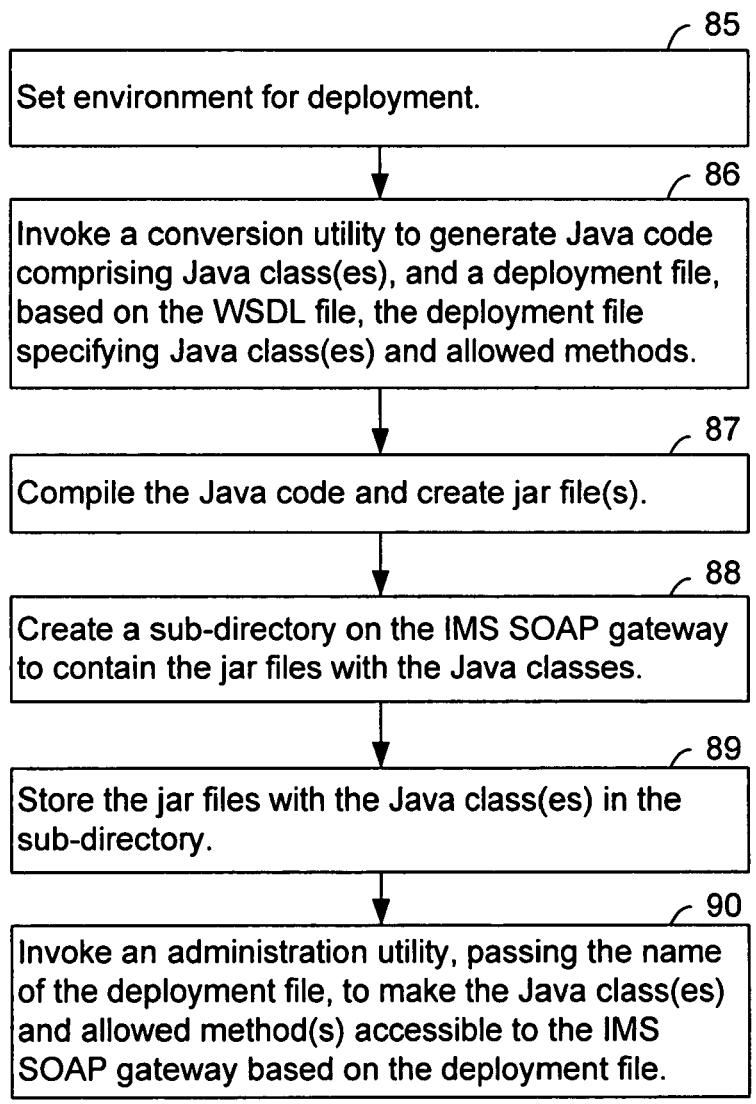
FIG. 4 depicts a flowchart of an embodiment of a step of generating one or more batch files comprising one or more instructions to generate and deploy a web service of FIG. 3.

FIG. 4 depicts a flowchart of an embodiment of step 83 of FIG. 3 which generates one or more batch files comprising one or more instructions to generate and deploy the web service. In step 85, the deployment utility generates one or more instructions which set an environment for deployment. In step 86, the deployment utility generates one or more instructions which invoke a conversion utility to generate Java code comprising one or more Java class(es), and a deployment file based on the WSDL file. The deployment file specifies Java class(es) and allowed methods. The allowed methods will be exposed to be accessed as a web service at the IMS SOAP gateway. In some embodiments, the conversion utility is an Apache Axis conversion utility; however, in other embodiments, the other conversion utilities may be used. In an embodiment which invokes Apache Axis, the deployment file is a deploy.wsdd file.

In step 87, the deployment utility generates one or more instructions to compile the Java code and create jar file(s). In some embodiments, the deployment utility also provides a Java compiler, and the generated instructions invoke that Java compiler. In other embodiments, the conversion utility also compiles the Java code and creates the jar file(s) and step 87 is omitted. In some embodiments which use Apache Axis, one or more jar file(s) are also modified to reference the IMS SOAP gateway.

In step 88, the deployment utility generates one or more instructions to create a sub-directory on the IMS SOAP gateway to contain the jar file(s) with the Java classes. In step 89, the deployment utility generates one or more instructions to store the jar file(s) with the Java class(es) in the sub-directory. In step 90, the deployment utility generates one or more instructions to invoke an administration utility, passing the name of the deployment file, which makes the Java class(es) and allowed method(s) accessible to the IMS SOAP gateway based on the deployment file. In some embodiments which use Apache Axis, the administration utility is an AdminClient utility and the deploy.wsdd file is passed to the AdminClient utility. However, in other embodiments, other administration utilities may be used.

In some embodiments, the deployment utility provides various tasks which guide the user through the deployment of the IMS application to the IMS SOAP gateway as a web service. Thus, the deployment utility simplifies the process for the user so that the user does not need to have prior knowledge about what steps need to be performed and the order of performing the steps. In various embodiments, the deployment utility has different invocation modes such as novice, expert and batch.

FIG. 5 comprises FIGS. 5A, 5B, 5C and 5D which collectively depict an embodiment of a user interface 92, 94, 96 and 98, respectively, of the deployment utility 56 (FIG. 1) in novice mode. In an expert mode, the deployment utility 56 provides the user with a command line interface to perform one or more tasks. In various embodiments, the deployment utility 20 comprises at least one or various combinations of a plurality of, or all, the following tasks:

Task 1 102, FIG. 5A: Start the IMS SOAP gateway
Task 2 104, FIG. 5A: Stop the IMS SOAP gateway
Task 3 106, FIG. 5A: Setup or update the IMS SOAP gateway properties
Task 4 108, FIG. 5A: Setup properties and deploy the IMS application to the IMS SOAP gateway as a web service
Task 5 110, FIG. 5B: Create or update interaction (correlator) properties
Task 6 112, FIG. 5B: Create, delete or update a connection bundle
Task 7 114, FIG. 5C: Deploy an application to the IMS SOAP gateway
Task 8 116, FIG. 5C: Generate Java client code for the application
Task 9 118, FIG. 5C: Undeploy an application from the IMS SOAP gateway
Task 10 120, FIG. 5D: Exit the deployment utility In some embodiments, the tasks will lead the user through entering information to perform that task. To invoke a task, a user enters the task number, as a command, at a prompt of the deployment utility. For example, a user invokes Task 4 by entering a "4" at a prompt of the deployment utility.

Task 4 108 of FIG. 5A is typically the first task to be performed by a user to deploy an IMS application to the IMS SOAP gateway as a web service, and, in some embodiments uses default properties. Tasks 5, 6, 7, 8 and 9, 110 (FIG. 5B), 112 (FIG. 5C), 114 (FIG. 5C) and 116 (FIG. 5C), respectively, will typically be performed after Task 4 to further customize the web service. For example, Task 5 110 (FIG. 5B) can be used to create or update interaction properties, that is, correlator properties in the correlator file which is used associated with the web service and used by the IMS SOAP gateway. Task 6 112 (FIG. 5C) can be used to create, delete or update the connection bundle, that is, the connection bundle properties, also referred to as connection properties, which comprises the information to connect to IMS. Task 7 114 (FIG. 5C) can be used to deploy an application to the IMS SOAP gateway. Task 8 116 (FIG. 5C) is used to generate client code for the application based on the WSDL file. In various embodiments, the client code is Java code; however, the invention is not meant to be limited to generating Java client code and client code may be generated in other languages. Task 9 118 (FIG. 5C) is used to undeploy an application from the IMS SOAP gateway. Tasks 1 and 2, 102 (FIG. 5A) and 104 (FIG. 3A), start and stop the IMS SOAP gateway 20, respectively.

As shown in FIGS. 5A and 5B, in Task 4 108, in step a 122, connection properties for connecting to IMS are provided. In step b 124, interaction, also referred to as correlator, properties for the application are provided. In step c 126, an application, that is, the web service, is deployed to the IMS SOAP gateway. The web service is generated based on the WSDL file, and the IMS SOAP gateway is started. In step d 128, client code is generated. In various embodiments, step d is optional.

Figure 6:
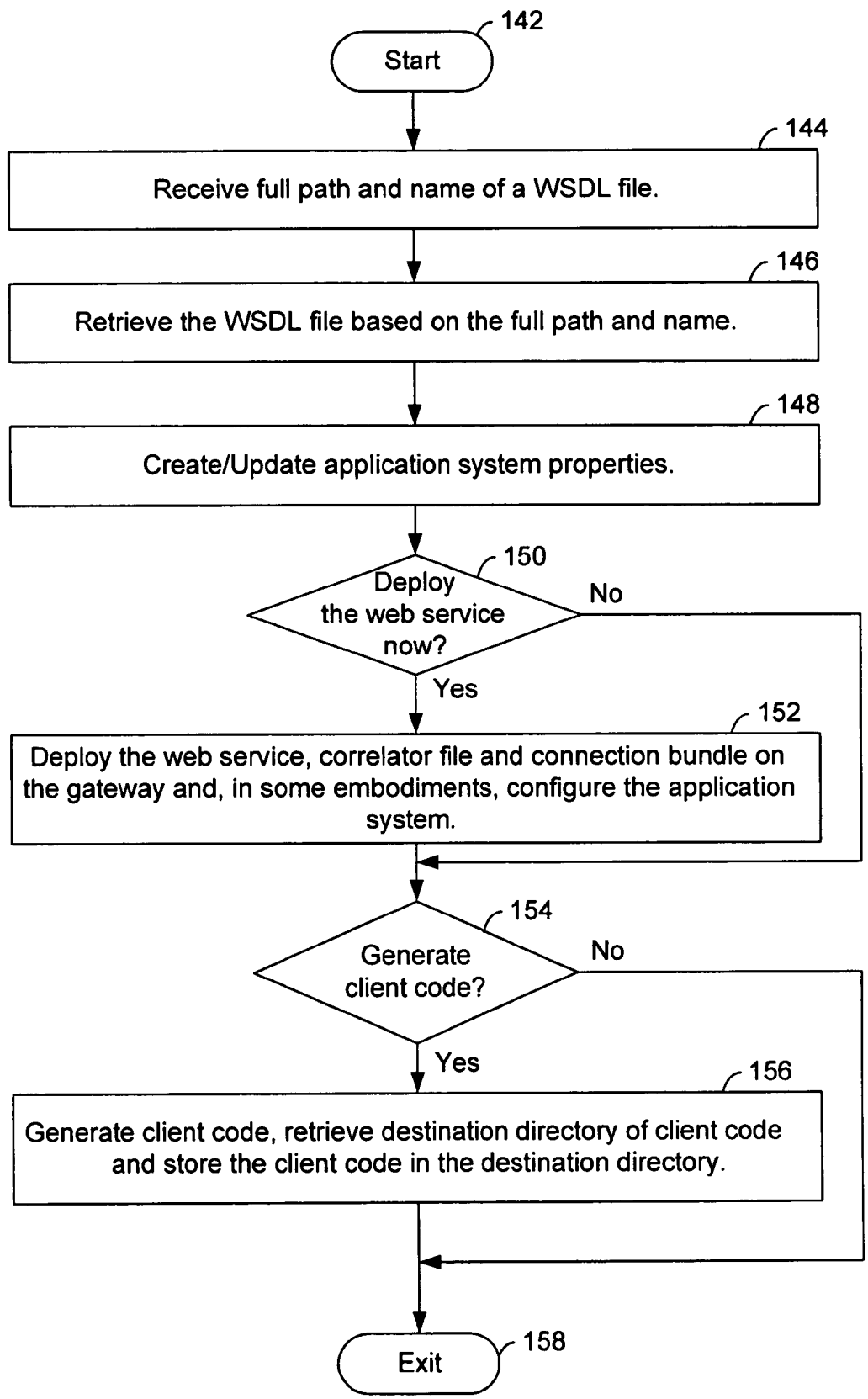
FIG. 6 depicts a flowchart of an embodiment of a deployment utility in accordance with Task 4 of the user interface of FIG. 5.

FIG. 6 depicts a flowchart of an embodiment of a deployment utility in accordance with Task 4 of FIG. 5. Task 4 is used to set up properties and deploy an IMS application to the IMS SOAP gateway as a web service. In step 142, the flowchart begins in response to a user selecting Task 4.

In step 144, the deployment utility receives the full path and name of the WSDL file. In some embodiments, if the name of the WSDL file is provided without the path, the deployment utility searches a predetermined default folder for the specified name of the WSDL file. In step 146, the deployment utility retrieves the WSDL file.

In step 148, the deployment utility creates and/or updates application system properties. In various embodiments, the application system properties comprise connection properties of a connection bundle and correlator (interaction) properties which are stored in a correlator file. In various embodiments, the application system is IMS. In some embodiments, step 148 implements steps a and b, 122 and 124, of FIGS. 5A and 5B, respectively. Step 148 will be described in further detail below with reference to FIGS. 7 and 8.

Steps 150 and 152 correspond to step c 126 of FIG. 5B. Step 150 prompts the user to ask if the user wants to deploy the web service now. In response to a "Yes", in step 152, the web service is deployed on the IMS SOAP gateway and, in some embodiments, the application system is configured. In various embodiments, the web service is generated based on the WSDL file and deployed as described above. Step 152 performs step 76 of FIG. 2. If the IMS SOAP gateway is not already started, the deployment utility starts the IMS SOAP gateway. Step 152 proceeds to step 154. In response to a "No" in step 150, step 150 proceeds to step 154.

Steps 154 and 156 correspond to step d 128 of FIG. 5B. In step 154, the deployment utility prompts the user to ask if the user wants to generate client code. In some embodiments, the client code is in the Java language; however, the invention is not meant to be limited to the Java language and the client code may be generated in other languages. In response to the user responding "Yes", in step 156, the client code is generated based on the WSDL file, and the client code is installed in a destination directory. The user builds a client application based on the client code and installs that client application on the client system. In some embodiments, a user is prompted to enter the path to the target directory for the client code. Alternately, a default path to the target directory for the client code is used. In some embodiments, a user sets the default path to the target directory for the client code. In step 158, Task 4 exits. In response to the user answering "No" in step 154, step 154 proceeds to step 158 and Task 4 exits.

Figure 7:
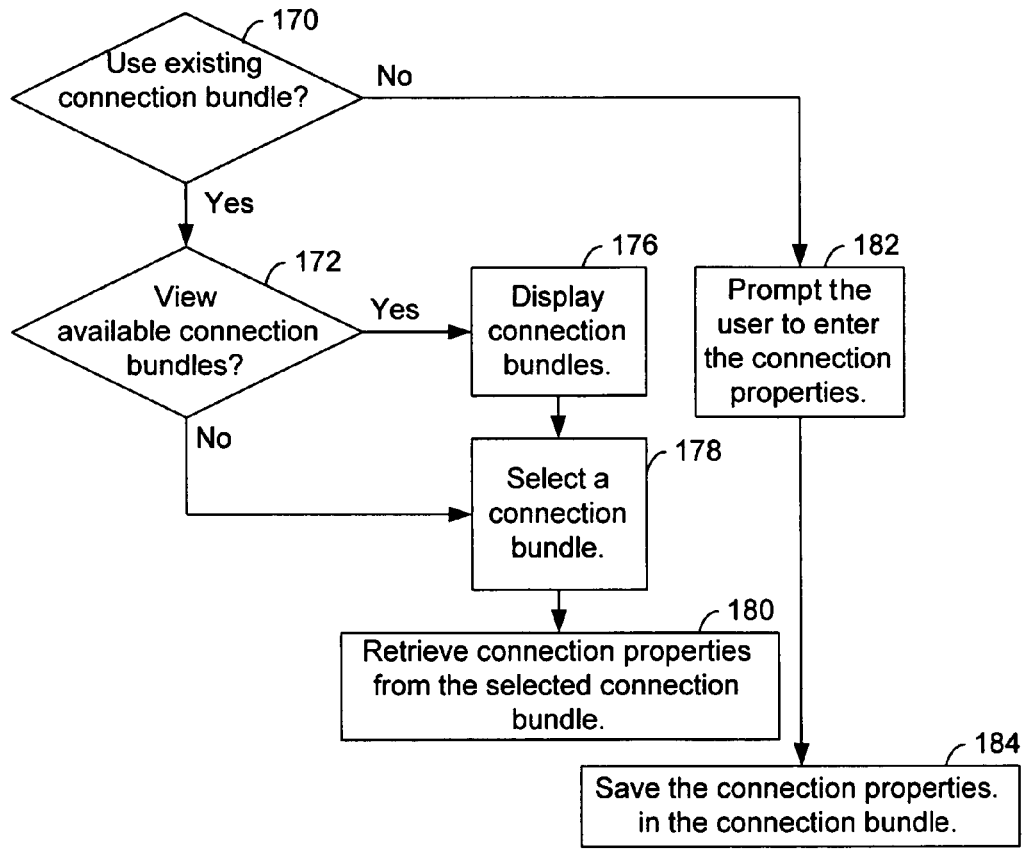
FIG. 7 depicts a flowchart of an embodiment of the step of creating/updating application system properties of FIG. 6.

FIG. 7 depicts a flowchart of an embodiment of creating/updating connection properties of step 148 of FIG. 6. In various embodiments, the flowchart of FIG. 7 corresponds to step a 112 of FIG. 5A. In some embodiments, the application system is IMS and the connection properties are used to access IMS. In step 170, the deployment utility prompts the user to ask if the user wants to use an existing connection bundle. If so, in step 172, the deployment utility asks whether the user wants to view available connection bundles. In response to a user responding "No," step 172 proceeds to step 178.

If in step 172, the user responds "Yes" to view available connection bundles, in step 176, the deployment utility displays the connection bundle. In step 178, a connection bundle is selected. In step 180, the connection properties are retrieved from the selected connection bundle.

If in step 170, the user responds "No" to not use an existing connection bundle, in step 182, the deployment utility prompts the user to enter the connection properties. In some embodiments, for example, the connection properties comprise connection bundle name, an IMS Connect host name, an IMS Connect port number (default: 9999), the IMS data store name, an optional resource access control facility (RACF) user identifier, an optional RACF group name and optional RACF password and the deployment utility prompts the user to enter each of the connection properties. In some embodiments, if a user does not enter a mandatory connection property, a default value is used for that connection property. In step 184, the connection properties are stored in the connection bundle having the specified name.

In some embodiments, the correlator properties are used to correlate or associate a web service with a driver in addition to specifying other interaction properties. The IMS SOAP gateway uses the correlator file to correlate an incoming SOAP request from the client application with an appropriate driver and, in some embodiments, a converter, on the application system based on one or more correlator properties. The IMS SOAP gateway also uses the correlator file to retrieve the name of connection bundle to use.

Figure 8:
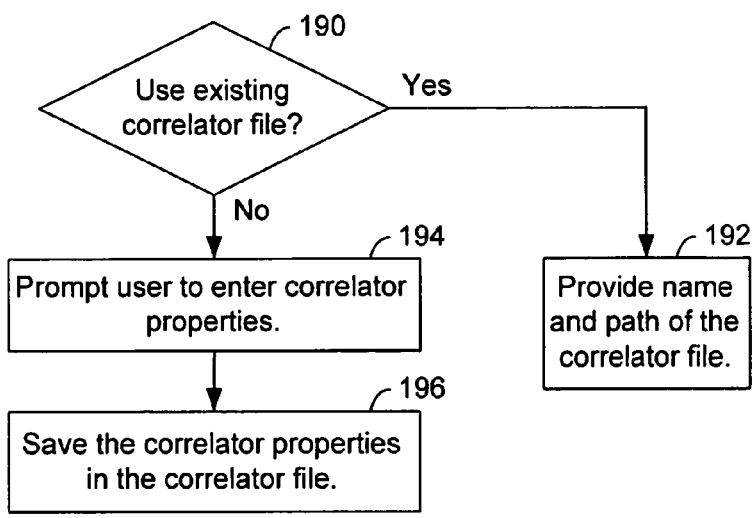
FIG. 8 depicts a flowchart of another embodiment of the step of creating/updating application system properties of FIG. 6.

FIG. 8 depicts a flowchart of another embodiment of the step of 148 of FIG. 6. In various embodiments, the flowchart of FIG. 8 corresponds to step b 124 of FIG. 5B. In step 190, the deployment utility asks the user if the user wants to use an existing correlator file. In response to the user responding "Yes", in step 192, the user provides the name and path of the correlator file to the deployment utility. In some embodiments, if the user does not provide a path, the deployment utility uses a predetermined default path. In response to the user responding "No", in step 194, the deployment utility prompts the user to enter correlator properties. For example, in some embodiments, the correlator properties comprise the driver name on the host, the socket timeout value (default: 0), an execution timeout value (default: 0), an optional LtermName, an inbound code page value (Default: 1140), a host code page value (Default: 1140) and an outbound code page value (Default: 1208). If a user does not enter a correlator property, a default value is used for that correlator property.

In step 196, the deployment utility stores the correlator properties in the correlator file. One example of a correlator file, called IVTNO.xml, is shown below:

```
<correlator>
    <SOAPAction>urn:IVTNO</SOAPAction>
    <programName>cancel</programName>
    <socketTimeout>100</ socketTimeout >
    < executionTimeout >100</executionTimeout >
    <adapterType> </adapterType >
    <connectionBundleName>new2</connectionBundleName >
    <inboundCCSID>1208</inboundCCSID >
    <hostCCSID>1140</hostCCSID >
    <outboundCCSID>1208</outboundCCSID >
    <trancode>cancel</trancode >
</correlator>
```

The exemplary correlator file above is for accessing an IMS application using IMS Connect and a driver named "cancel" in response to a web service having a urn called "IVTNO" being invoked on the IMS SOAP gateway. In other embodiments, the correlator file may comprise different correlator properties.

In some embodiments, step 148 of FIG. 6 comprises both FIG. 7 and FIG. 8.

Figure 9A:
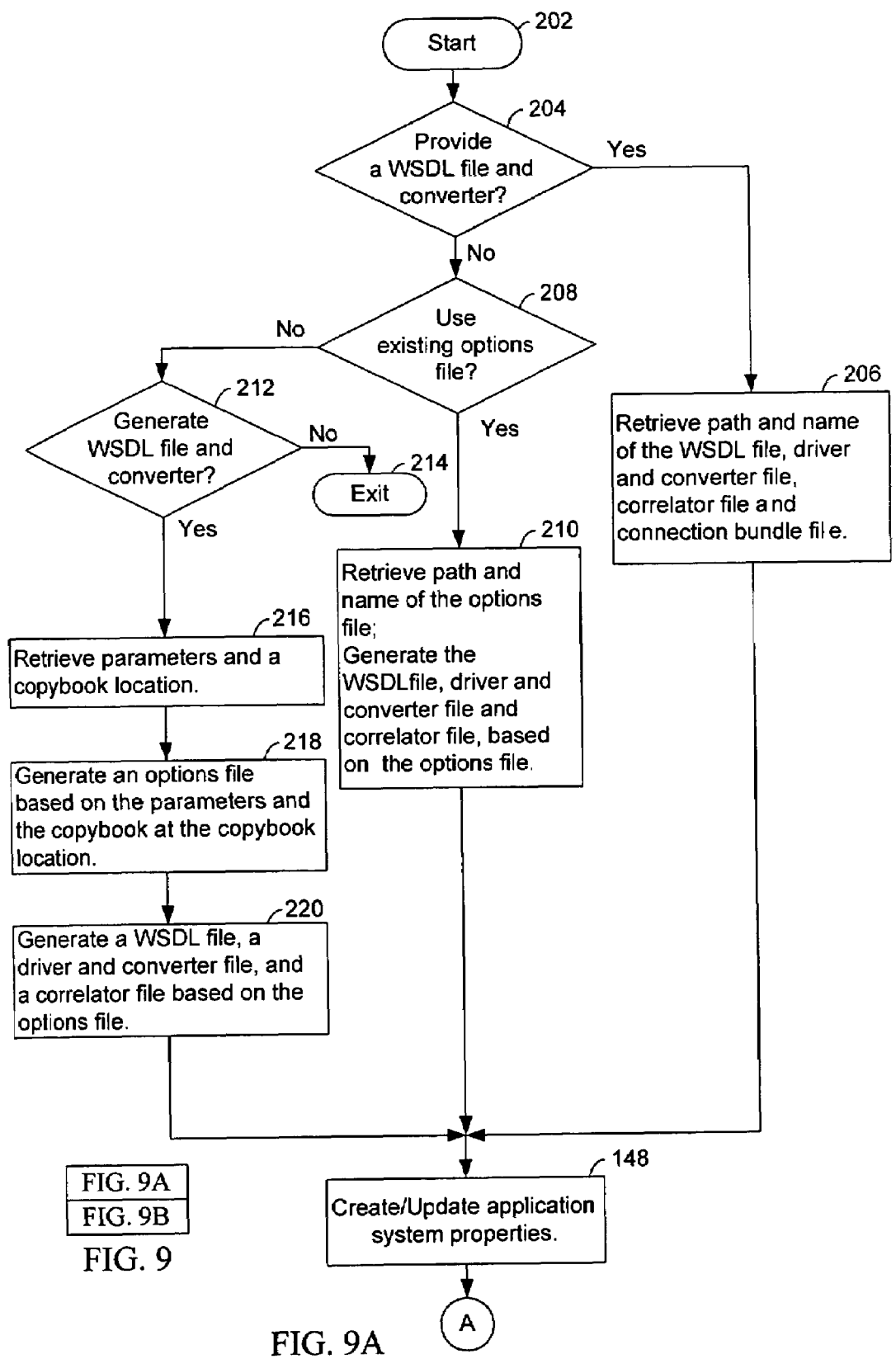
FIG. 9 comprises FIGS. 9A and 9B which collectively depict a flowchart of another embodiment of a deployment utility.
Figure 9B:
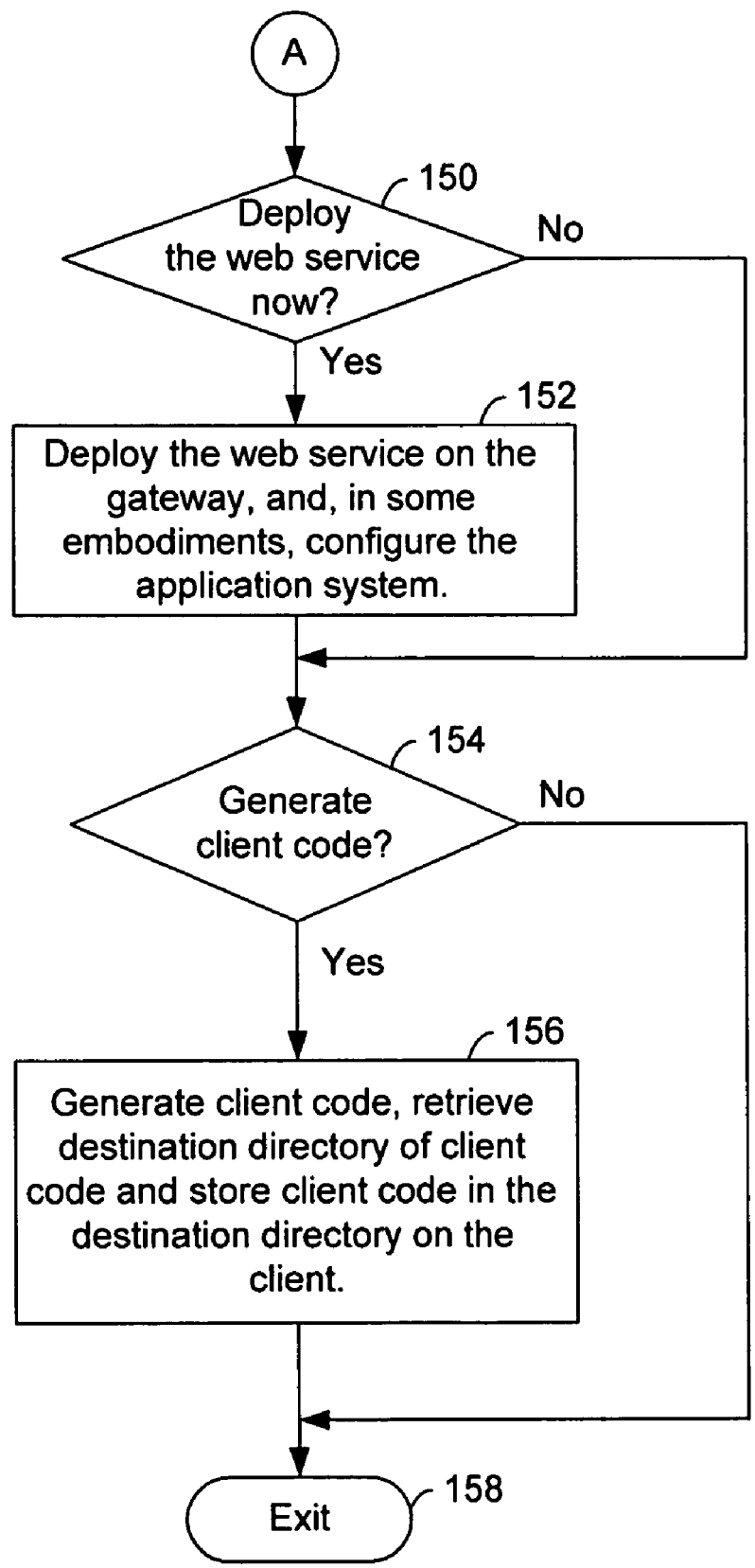

FIG. 9 comprises FIGS. 9A and 9B which collectively depict a flowchart of another embodiment of the deployment utility. In step 202, the user is prompted with a question asking whether the WSDL file and converters are being provided. In response to a user responding "Yes," in step 206, the deployment utility retrieves the path and name of the WSDL file, converter(s), correlator file and connection bundle. In some embodiments, a default name and/or default path is used for the WSDL file, converter file, correlator file and connection bundle. In some embodiments, the path and the name of the correlator file is omitted from step 206. In various embodiments, the path and name of the connection bundle are omitted. Step 206 proceeds to step 148.

In response to the WSDL file and converter(s), and in some embodiments, a driver, not being provided in step 204, for example, the user responds "No", step 208 determines whether an existing options file is to be used. In various embodiments, step 208 asks the user whether to use an existing options file either from user input or a default value. In response to a reply of "Yes," the deployment utility retrieves the path and name of the options file, and WDz is invoked to generate the WSDL file, driver, converters and correlator file based on the options file. The options file is used by WDz. Step 210 proceeds to step 148.

If step 208 determines that an existing options file is not to be used, step 212 prompts the user to determine if the user wants to generate the options file. If not, in step 214, the deployment utility exits. If so, in step 216, the deployment utility retrieves parameters and a copybook location. In step 218, the deployment utility generates the options file based on the parameters and copybook at the copybook location. In some embodiments, to generate the options file, the deployment utility prompts the user for the parameters of the options file. In various embodiments, the option parameters of the options file comprise: a copybook file name, input data type name, output data type name, inbound codepage, outbound codepage, host codepage, IMS SOAP gateway host name, IMS SOAP gateway port number, and file output file. In some embodiments, the copybook is a COBOL copybook. The options for generation of artifacts are stored in the options file. In step 220, the deployment utility invokes WDz to generate a WSDL file, driver, converter and correlator file based on the options file; therefore advantageously the user does not need to open WDz. Step 220 proceeds to step 148.

Steps 148-158 of FIG. 9 are the same as in FIG. 6 and will not be further described.

In other embodiments, the deployment utility allows a user to set up their own default properties for the correlator file, connection bundle, and in some embodiments, the options file, rather than using predefined default properties of the deployment utility.

Other tasks of the deployment utility will now be described. In various embodiments, the deployment utility provides a task, Task 3 (FIG. 5A), which allows a user to set a level of tracing. The trace levels are 1 for fatal, 2 for error, 3 for warn, 4 for info, 5 for debug. In some embodiments, the default trace level is 2. In various embodiments, the user can set the default level. The user is prompted to provide a trace filename or directory. If not provided, a default filename and directory are used. The user is also prompted to provide a maximum output file size, and if not provided a default file size is used. The user is prompted to provide a maximum number of backup files, and if not provided a default number is used. The user is also prompted to provide a port number for the IMS SOAP Gateway server, and if not provided a default port number is used.

In various embodiments, Task 5 (FIG. 5B) is used to create new correlator properties or update existing correlator properties. The user is prompted as to whether to create or update the correlator properties. In response to the user choosing to create correlator properties, the user is prompted to enter the full path and name of the WSDL file, and if not provided, a default full path name is used. The deployment utility retrieves the SoapAction URN from the WSDL file, and stores that URN in the correlator file. In some embodiments, the user is prompted to enter the following correlator properties:

Driver name on host
Socket timeout value (default: 0)
Execution timeout value (default: 0)
LtermName (optional)
Connection bundle name
Inbound code page value (Default: 1280)
Host code page value (Default: 1140)
Outbound code page value (Default: 1280)

The user is prompted to enter the full path of the correlator file. If no path is provided, the deployment utility uses a default path. The deployment utility stores the correlator properties in the correlator file. In various embodiments, if a user does not enter a correlator property, the deployment utility uses a default value for that correlator property.

If the user has chosen to update the correlator properties, the user is prompted as to whether they want to view the correlator file. The user is then prompted to select the property to update: driver name(d), socket timeout(s), execution timeout(e), LtermName(1), inbound codepage (i), host codepage (h), outbound codepage(o) and connection bundle(c). In response to selecting a correlator property, the current value is displayed and the user is prompted to enter a new value. The deployment utility saves the new value in the correlator file.

Task 6 (FIG. 5C) is used to create a new connection bundle, delete one or more existing connection bundle properties or update one or more existing connection bundle properties of the connection bundle. A connection bundle property is also referred to as a connection property. In response to the user choosing to create a connection bundle, the user is prompted to enter the name of the connection bundle. The user is then prompted to enter various connection bundle properties such as the IMS hostname or IP address, IMS port number (default: 9999), IMS datastore name, RACF userID (Optional), RACF group name (Optional), and RACF password (Optional). The deployment utility stores the properties in the connection bundle.

In Task 6 (FIG. 5C), in response to a user choosing to update the connection bundle, the user is prompted to enter the connection bundle property to update, such as the hostname(h), portnumber(p), datastore(d), userID(u), group(g) and password(s). The current value of the property is displayed and the user is prompted to enter a new value. The deployment utility updates the connection bundle with the new value for the property.

In Task 6 (FIG. 5C), in response to a user choosing to delete the connection bundle, the user is prompted for the connection bundle name to delete, and the deployment utility deletes that connection bundle from the connection bundle file.

Task 7 (FIG. 5C) is used to deploy an IMS application to IMS SOAP gateway. The deployment utility determines whether the IMS SOAP gateway is already executing. If not, the deployment utility will cause the IMS SOAP gateway to be executed. The deployment utility prompts the user to provide the full path and name of the WSDL file for the IMS application. If no path is provided, the deployment utility searches for the WSDL file in a predetermined default folder. In various embodiments, Task 7 performs steps 76 and 78 of FIG. 2. In some embodiments, the deployment utility compiles the driver and XML converter(s) and configures IMS Connect with the XML converter(s) and driver.

Task 8 (FIG. 5C) is used to generate client code for the IMS application. In Task 8, the deployment utility prompts the user to provide the full path and name of the WSDL file. If no path is provided, the deployment utility searches for the WSDL file in a predetermined folder. The user is also prompted to provide a path to the target directory for client code, and if not provided a predetermined default folder is used. The deployment utility invokes another utility to generate client code based on the WSDL and installs the client code in the target directory.

Task 9 (FIG. 5C) is used to undeploy an IMS application from the IMS SOAP Gateway. The user is prompted to provide the name of the web service to be undeployed, for example, PhoneBookService. The deployment utility assumes that the service has a WSDL file of the same name, for example, PhoneBookService.wsdl, already deployed in the IMS SOAP gateway. The deployment utility removes the associated WSDL file from the IMS SOAP gateway, and removes the associated XML COBOL converter and updates IMS Connect.

In expert mode, the deployment utility provides a command line interface comprising a plurality of deployment-utility commands. The command line interface comprises a deployment-utility command to start the IMS SOAP gateway: iogtool –1. The command line interface also comprises a deployment-utility command to stop the IMS SOAP gateway: iogtool –2.

To deploy an application, the command line interface provides a deployment-utility command as follows:

iogtool –7 –2 [WSDL file name] –c [correlator file name]

In various embodiments, this deployment-utility command causes the function of Task 7 (FIG. 5C) to be performed.

To generate client code the following deployment-utility command is used:

iogtool –8 –w [WSDL file name] –d [client code destination]. The order of the –w and –d parameters does not matter. In various embodiments, this command causes the functions of Task 8 (FIG. 5C) to be performed.

To undeploy an application, the following deployment-utility command is provided:

iogtool –9 –w [WSDL name].

In various embodiments, this command causes the functions of Task 9 (FIG. 5C) to be performed.

To create a new correlator using the command line interface, the following deployment-utility command is provided:

iogtool –5 –c –w [WSDL file name] [–parameters]

The parameters comprise:

-d [driver name (Default: )]
-s [socket timeout (Default: 0) ]
-e [execution timeout (Default: 0)]
-l [lterm name (Default: ) ]
-n [connection bundle name (Mandatory )]
-t [transaction code (Default: ) ]

Parameters having predefined values comprise:
Inbound Codepage: 1208
Host Codepage: 1140
Outbound Codepage: 1208.

Parameters are entered at the end of the command line and can be entered in any order. Parameters –n is mandatory in this command. Default values will be used for any parameters that are unspecified. A parameter that is entered but not followed by a value will also use a default value. Codepage parameters cannot be changed.

In various embodiments, the deployment utility checks the validity of each parameter and returns an error if a parameter is invalid. For example, the deployment utility checks that the socket timeout value is greater than zero, that the execution timeout is between −1 and 3600000, that the Iterm name is less than eight characters, that when the −n parameter is specified that the connection bundle name is provided, and that the connection bundle name is less than twenty characters and does not contain spaces.

The following deployment-utility command can be used to update an existing correlator file:

iogtool −5 −u −x [Correlator file name] [−parameters]

The parameters comprise:

```
-d [driver name (Default: )]
-s [socket timeout (Default: 0) ]
-e [execution timeout (Default: 0)]
-l [Iterm name (Default: ) ]
-t [transaction code (Default: )]
```

Parameters having predefined values comprise:

Inbound Codepage: 1208
Host Codepage: 1140
Outbound Codepage: 1208.

Parameters are entered at the end of the command line and can be entered in any order. Specifying the additional parameters will update the correlator file. A parameter that is entered but not followed by a value will be changed to the default value. Codepage parameters cannot be updated.

Connection bundle properties can also be set using the command line interface. To create a connection bundle, the following deployment-utility command is provided:

iogtool −6 −c −n [Connection bundle name] [−parameters]

The parameters comprise:

```
-h [host name (Default: )]
-p [port number (Default: 9999)]
-d [datastore name (Default: )]
-u [user Id (Default: )]
-s [password (Default: )]
-g [group name (Default: )]
```

Parameters are entered at the end of the command line and can be entered in any order. Default values will be used for any parameters that are not specified. A parameter that is entered but not followed by a value will use a default value.

In some embodiments, the deployment utility also checks the validity of the parameters and returns an error if a parameter is invalid. For example, the deployment utility checks that the connection bundle name has not been used and that the datastore name, the user identifier (Id) and password are less than or equal to eight characters.

The following command is used to update a connection bundle:

iogtool −6 −u −n [Connection bundle name] [−parameters]

The parameters comprise those listed above to create a connection bundle. In addition, the following parameter is provided:

−r [Connection bundle rename].

Parameters are entered at the end of the command line and can be entered in any order. Specifying the additional parameters will update the connection bundle. An option that is entered but not followed by a value will be changed to the default value.

The following deployment-utility command is used to delete an existing connection bundle:

iogtool −6 −d −n [Connection bundle name]

Various IMS SOAP gateway properties may be set or changed using the command line interface. The following deployment-utility command is used to set or change IMS SOAP gateway properties:

iogtool −3 [−parameters]

The parameters comprise:

```
-l [trace level (Default: 2)]
-f [trace filename/directory (Default: logs\\trace.log)]
-o [maximum output file size (Default: 100)]
-b [maximum number of backup files (Default: 2)]
-p [port number (Default: 8080)]
```

Values will remain unchanged for any parameters that are not specified. A parameter that is entered but not followed by a value will use a default value.

Various embodiments of the deployment utility provide a batch facility to support the deployment of an IMS application to an IMS SOAP gateway as a web service. A user creates a batch file comprising one or more deployment-utility commands of the command line interface of the deployment utility, and uses the deployment utility to execute the commands in the batch file.

Figure 10:
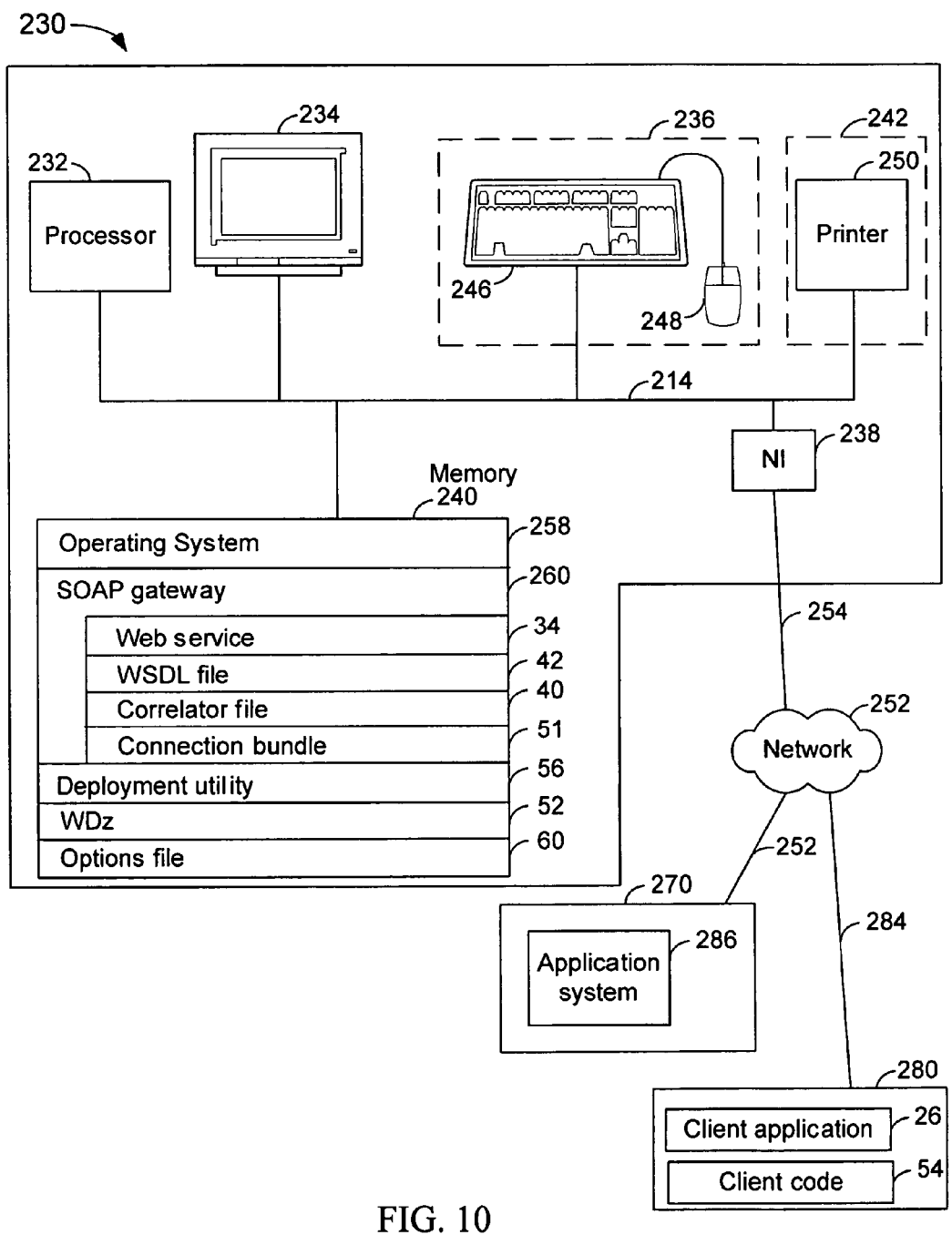
FIG. 10 depicts an illustrative computer system which uses various embodiments of the present invention.

FIG. 10 depicts an embodiment of an illustrative computer system 230 which uses various embodiments of the present invention. The computer system 230 is a server which hosts the SOAP gateway and comprises a processor 232, display 234, input interfaces (I/F) 236, communications interface 238, memory 240 and output interface(s) 242, all conventionally coupled by one or more buses 244. The input interfaces 236 comprise a keyboard 246 and a mouse 248. The output interface 242 comprises a printer 250. The communications interface 238 is a network interface (NI) that allows the computer 230 to communicate via the network 232. The communications interface 238 may be coupled to the network 252 via a transmission medium 254 such as a network transmission line, for example twisted pair, coaxial cable or fiber optic cable. In another embodiment, the communications interface 238 provides a wireless interface, that is, the communications interface 238 uses a wireless transmission medium.

The memory 240 generally comprises different modalities, illustratively semiconductor memory, such as random access memory (RAM), and disk drives. In various embodiments, the memory 240 stores an operating system 258, the deployment utility 56, the SOAP gateway 260, and in some embodiments WDz 52. The SOAP gateway 260 has a web service 34. In various embodiments, the SOAP gateway 260 is the IMS SOAP gateway 20 of FIG. 1. The SOAP gateway 260 comprises the web service 34, the WSDL file 42, the Correlator file 40 and the connection bundle 51. In other embodiments, the deployment utility 56 is stored and executed on a different computer system remote from computer system 230.

Computer systems 270 and 280 are coupled to the network 252 via transmission mediums 282 and 284, respectively. Computer system 270 comprises an application system 286.

In some embodiments, the application system 286 is IMS 28 of FIG. 1; however, in other embodiments, other application systems, both J2EE and non-J2EE, may be used. Computer system 280 comprises the client application 26 and client code 54.

In various embodiments, the specific software instructions, data structures and data that implement various embodiments of the present invention are typically incorporated in the deployment utility 56. Generally, an embodiment of the present invention is tangibly embodied in a computer-readable medium, for example, the memory 240, and is comprised of instructions which, when executed by the processor 232, cause the computer system 230 to utilize the present invention. The memory 240 may store the software instructions, data structures and data for any of the operating system 258 and deployment utility 56 in semiconductor memory, in disk memory, or a combination thereof. Other computer memory devices presently known or that become known in the future, or combination thereof, may be used for memory 240.

The operating system 258 may be implemented by any conventional operating system such as AIX® (Registered Trademark of International Business Machines Corporation), UNIX (Trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, computer system, apparatus or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device or media. In addition, the software in which various embodiments are implemented may be accessible through the transmission medium, for example, from a server over the network. Thus the article of manufacture also comprises the medium in which the code is embedded. Those skilled in the art will recognize that many modifications may be made to this configuration without departing from the scope of the present invention.

The exemplary computer system illustrated in FIG. 10 is not intended to limit the present invention. Other alternative hardware environments may be used without departing from the scope of the present invention.

In some embodiments, the utility provides a light-weight, stand-alone command line utility, including a batch facility, to help IMS customers retarget IMS applications to support Web services without changing the existing IMS applications. In various embodiments, the deployment utility provides the customer with an end-to-end utility to automate the process of enabling IMS applications as web services. Although various embodiments have been described with respect to XML, in other embodiments, other mark-up languages may be used rather than XML.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method of enabling an application in a legacy system to be accessed as a web service, comprising:
   in response to receiving, by a deployment utility, a task command of a plurality of task commands:
      deploying by said deployment utility, to a gateway server, a web service that was generated based on a web service description language (WSDL) file that is based on an input-output message description of said application, wherein said web service is accessible to a client using a Simple Object Access Protocol (SOAP) message, said gateway server to send a request message to said application based on said SOAP message in accordance with said web service, and said gateway server to receive a reply message from said application and return a SOAP response to said client based on said reply message in accordance with said web service;
      providing a connection bundle comprising connection information to interface with said application, wherein said deployment utility makes said connection bundle accessible to said gateway server, said providing said connection bundle comprising:
         prompting, by said deployment utility, for at least one connection property;
         in response to said prompting, by said deployment utility, for said at least one connection property, receiving said at least one connection property to access said legacy system; and
         storing said at least one connection property in said connection bundle; and
      providing a correlator file comprising a name of an interface module associated with said application, also comprising a name of said connection bundle, wherein said deployment utility makes said correlator file accessible to said gateway server.

2. The method of claim 1 wherein said interface module is to invoke a converter to convert said request message from a mark-up language to an application language, wherein said interface module is at said legacy system and said converter is at said legacy system, and to invoke another converter to convert an application reply in the application language to said reply message in said mark-up language, wherein said another converter is at said legacy system.

3. The method of claim 1 wherein said deploying said web service comprises:
   invoking, by said deployment utility, a generation utility to generate at least one code module based on said WSDL file, and also to generate a deployment file, said deployment file specifying at least one allowed software method of said at least one code module;
   invoking, by said deployment utility, a software compiler to compile said at least one code module to provide at least one compiled module comprising said at least one allowed software method;
   storing said at least one compiled module in a predetermined location accessible to said gateway server; and
   invoking, by said deployment utility, an administration utility to configure said web service on said gateway server based on said deployment file, wherein said administration utility makes said at least one allowed software method of said at least one compiled module accessible to said gateway server, said at least one allowed software method being exposed to provide said web service.

4. The method of claim 3 wherein said deploying further comprises:
- generating, by said deployment utility, at least one instruction to perform said invoking said generation utility, said invoking said software compiler, said storing, and said invoking said administration utility; and
- executing, by said deployment utility, said at least one instruction.

5. The method of claim 1 further comprising:
- invoking, by said deployment utility, a WSDL generation utility to generate said WSDL file based on said input-output message description.

6. The method of claim 5 wherein said WSDL generation utility also generates said correlator file.

7. The method of claim 1 further comprising:
- invoking, by said deployment utility, a client-code-generation utility to generate client code based on said WSDL file.

8. The method of claim 1 wherein said legacy system is an Information Management System (IMS) and said application is an IMS application.

9. The method of claim 1 further comprising:
- prompting, by said deployment utility, for at least one correlator property;
- in response to said prompting for said at least one correlator property, receiving said at least one correlator property; and
- storing said at least one correlator property in said correlator file.

10. The method of claim 1 further comprising:
- in response to another task command of said plurality of task commands, modifying, by said deployment utility, said correlator file.

11. The method of claim 1 further comprising:
- in response to another task command of said plurality of task commands, modifying, by said deployment utility, said connection bundle.

12. The method of claim 1 further comprising:
- executing, by said deployment utility, a plurality of deployment-utility commands of a batch file, said plurality of deployment-utility commands comprising one or more of the following deployment-utility commands in any combination:
  - a deployment-utility command to create another correlator file,
  - a deployment-utility command to create another connection bundle, and
  - a deployment-utility command to deploy, to said gateway server, another web service that was generated based on another WSDL file that is based on another input-output message description of another application, wherein said another web service is accessible to said client using another SOAP message, said another web service being used to communicate with said another application.

13. The method of claim 1 further comprising:
- receiving, by said deployment utility, another task command of said plurality of task commands from a user, said another task command to update said connection bundle;
- in response to said receiving said another task command, prompting, by said deployment utility, said user to determine whether said user wants to view said connection bundle;
- in response to said prompting, displaying, by said deployment utility, a plurality of connection properties of said connection bundle comprising an Information Management System (IMS) hostname, a port number and an IMS datastore name;
- receiving an identifier of a particular connection property of said plurality of connection properties to update;
- receiving, by said deployment utility, a new value of said particular connection property; and
- storing, by said deployment utility, said new value of said particular connection property in said connection bundle.

14. The method of claim 1 further comprising:
- receiving, by said deployment utility, another task command of said plurality of task commands from a user, said another task command to update said correlator file;
- in response to said another task command, prompting, by said deployment utility, said user to determine whether said user wants to view said correlator file;
- in response to said prompting, displaying, by said deployment utility, a plurality of correlator properties of said correlator file comprising a driver name of a host to communicate with said legacy system and said name of said connection bundle;
- receiving, by said deployment utility, a new value of a particular correlator property of said plurality of correlator propertiers; and
- storing, by said deployment utility, said new value of said particular correlator property in said correlator file.

15. The method of claim 1 further comprising:
- in response to another task command of said plurality of task commands, said another task command to set a level of tracing, receiving, by said deployment utility, a new trace level and updating, by said deployment utility, said gateway server with said new trace level.

16. The method of claim 1 further comprising:
- in response to another task command of said plurality of task commands, said another task command to start said gateway server, starting, by said deployment utility, said gateway server; and
- in response to yet another task command of said plurality of task commands, said yet another task command to stop said gateway server, stopping, by said deployment utility, said gateway server.

17. The method of claim 1 further comprising:
- in response to another task command of said plurality of task commands, said another task command to undeploy, receiving a web service name of said web service, wherein a WSDL file name of said WSDL file comprises said name of said web service; and removing by said deployment utility, said WSDL file having said WSDL file name.

18. A computer-implemented method of enabling an application in a legacy system to be accessed as a web service, comprising: in response to receiving, by a deployment utility, a task command of a plurality of task commands from a user:
- receiving, by said deployment utility, a particular name of a web service description language (WSDL) file from said user, said WSDL file having said particular name being based on an input-output message description of said application;
- first prompting, by said deployment utility, said user to provide a connection bundle, wherein said connection bundle comprises connection information to interface with said application;
- in response to said first prompting, receiving a connection bundle name from said user;
- second prompting, by said deployment utility, said user to provide a correlator file, wherein said correlator file comprises a plurality of correlator properties comprising a name of an interface module associated with said application and said connection bundle name;

in response to said second prompting, receiving a correlator file name from said user;

third prompting, by said deployment utility, said user to determine whether to deploy;

in response to said third prompting, receiving an indication to deploy from said user, and fourth prompting, by said deployment utility, said user to determine whether a gateway server is started;

in response to receiving an indication that said gateway server is not started, starting, by the deployment utility, said gateway server;

deploying by said deployment utility, to said gateway server, a web service that was generated based on said WSDL file having said particular name, wherein said web service is accessible to a client using a Simple Object Access Protocol (SOAP) message, said gateway server to send a request message to said application based on said SOAP message in accordance with said web service, and said gateway server to receive a reply message from said application and return a SOAP response to said client based on said reply message in accordance with said web service;

wherein said deployment utility makes a connection bundle having said connection bundle name accessible to said gateway server; and wherein said deployment utility makes a correlator file having said correlator file name accessible to said gateway server.

19. The method of claim 18 further comprising:

fifth prompting, by said deployment utility, said user to determine whether to generate client code; and in response to said fifth prompting, receiving an indication to generate client code from said user, and invoking, by said deployment utility, a client-code-generation utility that generates client code based on said WSDL file, said client code comprising a software method to invoke said web service.

20. A computer-implemented method of deploying a web service to access an application in a legacy system, comprising:

generating, by a deployment utility, a batch file comprising:

at least one first instruction that invokes a conversion utility to generate Java code comprising at least one Java class and a deployment file based on a Web Service Description Language (WSDL) file, said deployment file specifying at least one Java class and at least one allowed method, said WSDL file being based on a COBOL copybook associated with said application;

at least one second instruction that invokes a Java compiler to compile said Java code to create compiled code comprising said at least one allowed method;

at least one third instruction that creates a sub-directory at an Information Management System (IMS) Simple Object Access Protocol (SOAP) gateway;

at least one fourth instruction that stores said compiled code in said sub-directory;

at least one fifth instruction that invokes an administration utility based on the deployment file, the administration utility making said at least one allowed method of said compiled code accessible to said IMS SOAP gateway, wherein said at least one allowed method will be exposed to be accessed as said web service; and executing, by said deployment utility, said at least one first instruction, said at least one second instruction, said at least one third instruction, said at least one fourth instruction and said at least one fifth instruction of said batch file, wherein said deployment utility deploys said web service to said IMS SOAP gateway, wherein said web service is accessible to a client using a SOAP message, said IMS SOAP gateway to send a request message from said client to said application based on said SOAP message in accordance with said web service, and said IMS SOAP gateway to receive a reply message from said application and return a SOAP response to said client based on said reply message in accordance with said web service;

providing a connection bundle comprising connection information to interface with said application, wherein said deployment utility makes said connection bundle accessible to said IMS SOAP gateway; and providing a correlator file comprising a name of an interface module associated with said application, also comprising a name of said connection bundle, wherein said deployment utility makes said correlator file accessible to said IMS SOAP gateway.

21. A computer program product for enabling an application in a legacy system to be accessed as a web service, said computer program product comprising:

a computer readable medium;

a deployment utility comprising first program instructions to, in response to receiving a task command of a plurality of task commands:

deploy, to a gateway server, a web service that was generated based on a web service description language (WSDL) file that is based on an input-output message description of said application, wherein said web service is accessible to a client using a Simple Object Access Protocol (SOAP) message, said gateway server to send a request message to said application based on said SOAP message in accordance with said web service, and said gateway server to receive a reply message from said application and return a SOAP response to said client based on said reply message in accordance with said web service;

provide a connection bundle comprising connection information to interface with said application, wherein said deployment utility makes said connection bundle accessible to said gateway server, said first program instructions to provide said connection bundle to:

prompt for at least one connection property;

in response to said prompt for said at least one connection property, receive said at least one connection property to access said legacy system;

store said at least one connection property in said connection bundle; and provide a correlator file comprising a name of an interface module associated with said application, also comprising a name of said connection bundle, wherein said deployment utility makes said correlator file accessible to said gateway server;

wherein said deployment utility comprising said first program instructions are stored on said computer readable medium.

22. The computer program product of claim 21 wherein said deployment utility comprises:

second program instructions to invoke a WSDL generation utility to generate said WSDL file based on said input-output message description;
wherein said second program instructions are stored on said computer readable medium.

23. The computer program product claim 21 wherein said deployment utility comprises:
second program instructions to invoke a client-code-generation utility to generate client code based on said WSDL file;
wherein said second program instructions are stored on said computer readable medium.

24. The computer program product of claim 21 wherein said deployment utility comprises:
second program instructions to, in response to another task command of said plurality of task commands, modify said connection bundle;
wherein said second program instructions are stored on said computer readable medium.

25. A system for enabling an application in a legacy system to be accessed as a web service, comprising:
a processor; and
a memory storing a deployment utility, said deployment utility comprising instructions that are executable by said processor for:
in response to receiving a task command of a plurality of task commands:
deploying to a gateway server, a web service that was generated based on a web service description language (WSDL) file that is based on an input-output message description of said application, wherein said web service is accessible to a client using a Simple Object Access Protocol (SOAP) message, said gateway server to send a request message to said application based on said SOAP message in accordance with said web service, and said gateway server to receive a reply message from said application and return a SOAP response to said client based on said reply message in accordance with said web service;
providing a connection bundle comprising connection information to interface with said application, wherein said deployment utility makes said connection bundle accessible to said gateway server, said providing said connection bundle comprising:
prompting for at least one connection property;
in response to said prompting for said at least one connection property, receiving said at least one connection property to access said legacy system;
storing said at least one connection property in said connection bundle; and
providing a correlator file comprising a name of an interface module associated with said application, also comprising a name of said connection bundle, wherein said deployment utility makes said correlator file accessible to said gateway server.

26. The system of claim 25 wherein said deployment utility further comprises instructions for:
invoking a WSDL generation utility to generate said WSDL file based on said input-output message description.

27. The system of claim 25 wherein said deployment utility further comprises instructions for:
in response to another task command of said plurality of task commands, modifying, by said deployment utility, said correlator file.

28. The system of claim 25 wherein said deployment utility further comprises instructions for:
in response to another task command of said plurality of task commands, modifying, by said deployment utility, said connection bundle.

* * * * *